(12) United States Patent
Weinholt

(10) Patent No.: US 8,897,404 B2
(45) Date of Patent: Nov. 25, 2014

(54) CANCELING INTERFERENCE BETWEEN A PLURALITY OF SIGNALS IN A COMMUNICATION SYSTEM

(75) Inventor: Dan Weinholt, Vastra Frolunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 50 days.

(21) Appl. No.: 13/878,926

(22) PCT Filed: Oct. 11, 2010

(86) PCT No.: PCT/EP2010/065185
§ 371 (c)(1),
(2), (4) Date: Apr. 11, 2013

(87) PCT Pub. No.: WO2012/048723
PCT Pub. Date: Apr. 19, 2012

(65) Prior Publication Data
US 2013/0216012 A1    Aug. 22, 2013

(51) Int. Cl.
*H04B 7/10* (2006.01)
*H04B 7/08* (2006.01)
*H04L 7/00* (2006.01)
*H04J 11/00* (2006.01)
*H04L 25/03* (2006.01)

(52) U.S. Cl.
CPC ............... *H04L 25/03* (2013.01); *H04B 7/084* (2013.01); *H04L 7/0016* (2013.01); *H04B 7/10* (2013.01); *H04J 11/004* (2013.01)
USPC ........................................................ 375/347

(58) Field of Classification Search
CPC ............................................. H03B 2200/009
USPC ........................................................ 375/347
See application file for complete search history.

(56) References Cited

U.S. PATENT DOCUMENTS

| 8,526,528 | B2* | 9/2013 | Ravid et al. | 375/267 |
| 2004/0119545 | A1* | 6/2004 | Ogiso | 331/74 |
| 2005/0122179 | A1* | 6/2005 | Ogiso | 331/107 A |
| 2005/0122785 | A1* | 6/2005 | Umeda et al. | 365/187 |
| 2006/0049834 | A1* | 3/2006 | Umeda | 324/658 |
| 2006/0255859 | A1* | 11/2006 | Zanchi et al. | 330/277 |
| 2008/0062311 | A1* | 3/2008 | Song et al. | 348/457 |
| 2008/0062312 | A1* | 3/2008 | Song et al. | 348/457 |

FOREIGN PATENT DOCUMENTS

WO    2009/069798 A1    6/2009

OTHER PUBLICATIONS

Ingason et al. "Impact of Frequency Selective Channels on a Line-of-Sight MIMO Microwave Radio Link" 2010 IEEE Vehicular Technology Conference, XP031695954, 5 pages.
Murch et al. "Layered Space-Time Equalization for Wireless MIMO Systems" IEEE Transactions on Wireless Communication, 2(6):1189-1203, XP011103221, 2003.

* cited by examiner

*Primary Examiner* — Santiago Garcia
(74) *Attorney, Agent, or Firm* — Rothwell, Figg, Ernst & Manbeck, P.C.

(57) ABSTRACT

The present solution relates to a method in a communication node (201, 204, 210, 213) for canceling interference between a plurality of signals in a communication system (200). The communication node receives (501), at each of a plurality of receiver antennas (407), a respective signal. The communication node (201, 204, 210, 213) cancels (502) a first part of interference between the plurality of received signals. Then, the interference cancelled signals and the received signals are filtered (504) before a second part of interference between the filtered signals is cancelled (505).

8 Claims, 6 Drawing Sheets

CANCELING INTERFERENCE BETWEEN A PLURALITY OF SIGNALS IN A COMMUNICATION SYSTEM

TECHNICAL FIELD

This invention relates generally to a communication node and a method in the communication node.

More particularly this invention relates to canceling of interference between a plurality of signals in a communication system.

BACKGROUND

A Multiple-Input-Multiple-Output (MIMO) system is a system having more than one input and more than one output, in other words both the transmitter Tx and receiver Rx of a MIMO system have multiple antennas operating over the same bandwidth. This allows a MIMO system to have higher throughput for the same spectrum because of its ability to transmit and receive multiple streams of data simultaneously. A MIMO system with similar count of antennas at both the transmitter and the receiver in a point-to-point (PTP) radio link is able to multiply the system throughput linearly with every additional antenna. For example, a 2×2 MIMO will double the throughput compared to a Single Input Single Output (SISO) system.

A MIMO system may be a Line Of Sight (LOS) MIMO system or a non-LOS MIMO system. In a LOS MIMO system, a signal travels over the air directly from a transmitter to a receiver in a straight line without passing any obstructions. On the other hand, in a non-LOS MIMO system a signal passes obstructions when traveling from a transmitter to a receiver. A signal that passes obstacles on its way may be reflected, diffracted, absorbed, scattered etc., which may create multiple signals that will arrive at the receiver at different times, paths and with different signal strength.

MIMO systems for PTP radio links differs from non-LOS MIMO systems in that sense that the channels between transmit and receive antennas are close to static. A well known solution is in this case to use a canceling technique similar to what is used in Cross-Polar-Interference-Cancellation (XPIC). In this case all phase tracking may be allocated to the receive side which may be required in case of microwave frequencies where hardware related aspects such as phase noise may be more critical.

As known for a person skilled in the art, an XPIC system is an adaptive coupling electronic circuit handling the problem of cross-polarization interference. An XPIC circuit is a circuit between two orthogonal co-frequency channels used to reduce cross-polar interference during adverse propagation conditions. An XPIC system filters a cross-polarization interference signal in order to successfully receive or decode a desired signal.

FIG. 1 shows a block diagram of a simplified 2×2 non-LOS MIMO system 100, where 2×2 implies two antennas Tx1, Tx2 101 at the transmitter and two antennas Rx1, Rx2 103 at the receiver. The 2×2 MIMO system 100 equals an XPIC system. The main difference between the MIMO and XPIC is that in an XPIC application the phase difference between the two received signals is not defined, which may result in destructive phases in the addition point after the two adaptive filters 1 and 2 105. Therefore, in this case there may be a limit on the cross signal levels that may not be exceeded. However, in case of LOS-MIMO this phase difference is controlled by the antenna separation and the destructive case is avoided and thereby there is no cross level limitation.

The block diagram also comprises a Canceller-Phase Locked Loop (CLR-PLL) 108 and a symbol clock regeneration 110. The phase tracking of differential phase noise may be improved by adding the separate CLR-PLL 108. The regenerated symbol clock is a clock signal which is synchronized with the signals received at the receiver antennas Rx1, Rx2 103.

In FIG. 1 in general, signals, i.e. data modulated signals data 1 and data 2, sent from the two transmitters Tx1, Tx2 101 are received in the receivers Rx1, Rx2 103. The received signals are filtered in the adaptive filter 1 and adaptive filter 2 105. A symbol clock signal, i.e. the clock of the input digital data, is also regenerated 110 at the same time as the filtering is performed. Then, all interference between the outputs from the adaptive filters 105 is cancelled 111, i.e. using a summing point and phase rotators. In the receiver Rx1 103 the signals from both transmitter antennas Tx1 and Tx2 101 are present and the signal from the second transmitter antenna Tx2 101 should be cancelled. In order to do that, it is necessary to track the differential phase noise between the receivers Rx1 and Rx2 103.

The phase tracking of differential phase noise is improved by running the signals through the CLR-PLL 108. The error feedback generator 112 comprises several functions, such as symbol decision, symbol error detection and modification of symbol errors for filter coefficient update. In other words, it comprises generation of errors from the interference cancelled signals. The dotted box 115 comprises the same components discussed above, adaptive filters 1 and 2 105, CLR-PLL 108, symbol clock regeneration 110, canceller 111 and error feedback generator 112, but they are not repeated for the sake of simplicity. The data output from the non-LOS MIMO system 100 are data 1 and data 2, i.e. the same data as input into the system 100.

A problem with the solution shown in FIG. 1 when used as a 2×2-LOS-MIMO system is the symbol clock generation. The two received signals in each of the receivers 103 usually have equal signal level. It is difficult to control the exact clock timing difference and if no countermeasures are taken it will result in large clock jitter or even lack of clock synchronization.

SUMMARY

The objective problem is therefore to provide improved interference canceling in a communication network.

According to a first aspect of the invention, the objective problem is solved by a method in a communication node for canceling interference between a plurality of signals in a communication system. The communication node receives, at each of a plurality of receiver antennas, a respective signal. Then, a first part of interference between the plurality of received signals is cancelled. The interference cancelled signals and the received signals are filtered before a second part of interference between the filtered signals is cancelled.

According to a first aspect of the invention, the objective problem is solved by a communication node for canceling interference between a plurality of signals in a communication system. The communication node comprises a plurality of receiver antennas each being configured to receive a respective signal. The communication node further comprises a canceling unit which is configured to cancel a first part of interference between the plurality of received signals. Further, the communication node comprises a filtering unit configured to filter the interference cancelled signals and the received input signals. The canceling unit is further configured to cancel a second part of interference between the filtered signals.

Since the interference canceling is split into two parts, a first part performed before the adaptive filtering and a second part performed after the adaptive filtering, the interference canceling in a communication network is improved.

The present technology affords many advantages, for which a non-exhaustive list of examples follows:

An advantage of the present solution is the improvement of both the clock regeneration performance while maintaining the differential phase noise suppression performance.

Since the major part of the cancellation is done before the symbol clock regeneration the present solution gives the benefit of reducing the effect of clock timing to a large extent.

Another advantage is that by leaving a part of the addition/interference canceling after the filter, the bandwidth of the CLR-PLL for this part may be high since the filter delay is not comprised in the round trip delay of this loop.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the solution and in which.

The drawings are not necessarily to scale. Emphasis is instead being placed upon illustrating the principle of the present solution.

DETAILED DESCRIPTION

The present solution is related to cancellation in radio link systems. In more detail, the present solution it is related to splitting a "canceling" addition in LOS-MIMO radio link systems by performing one canceling addition before a first adaptive filter and the remaining part after the first adaptive filter. In some embodiments, the major part of the canceling is done before the first adaptive filter and a smaller part is done after. The present solution is applicable to radio link communication between nodes. The solution is applicable to communication within a core network as well as a mobile backhaul network. In other words, the present solution is related to a radio link communication hop which may be comprised in all kinds of communication networks.

Figure 1:
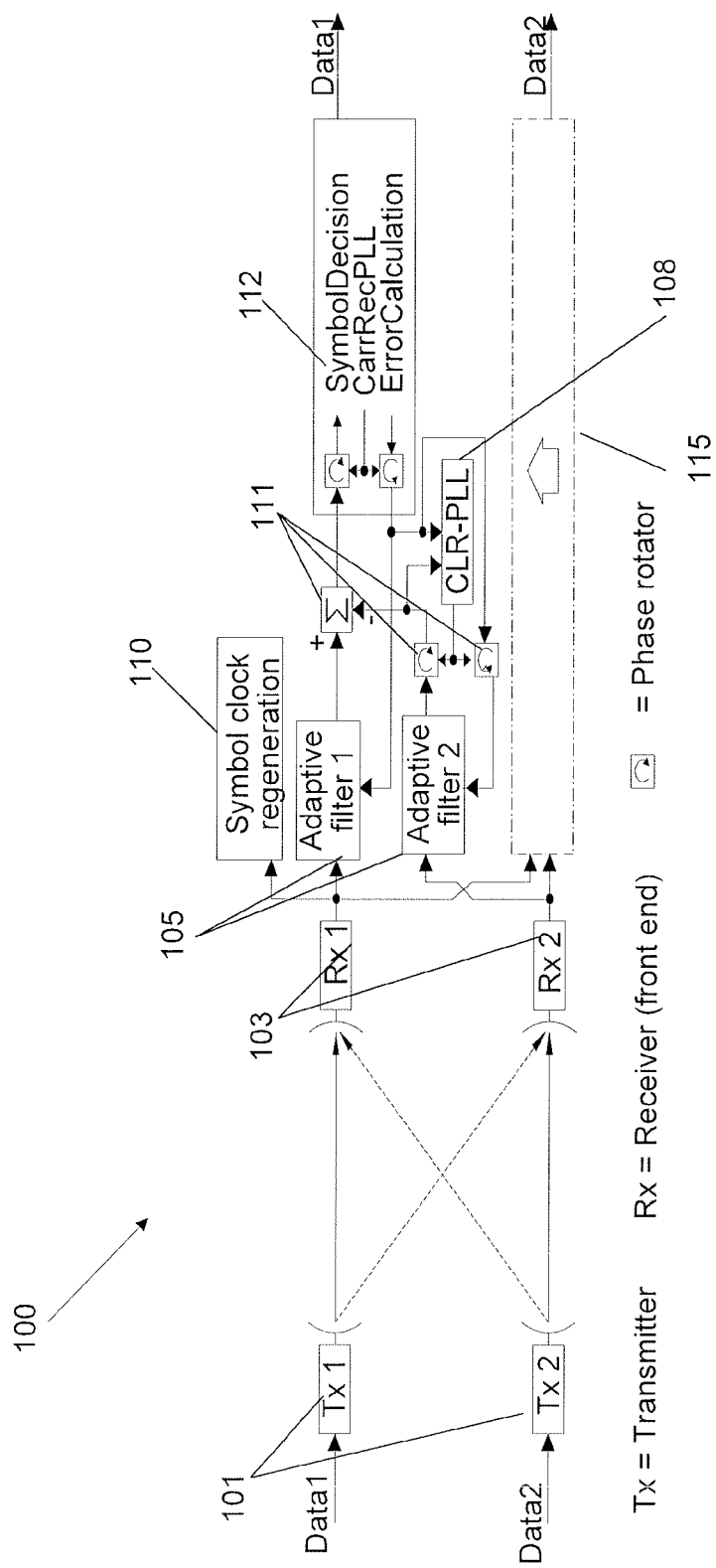
FIG. 1 is a block diagram illustrating a prior art configuration a 2×2-LOS-MIMO or an XPIC system.
Figure 2:
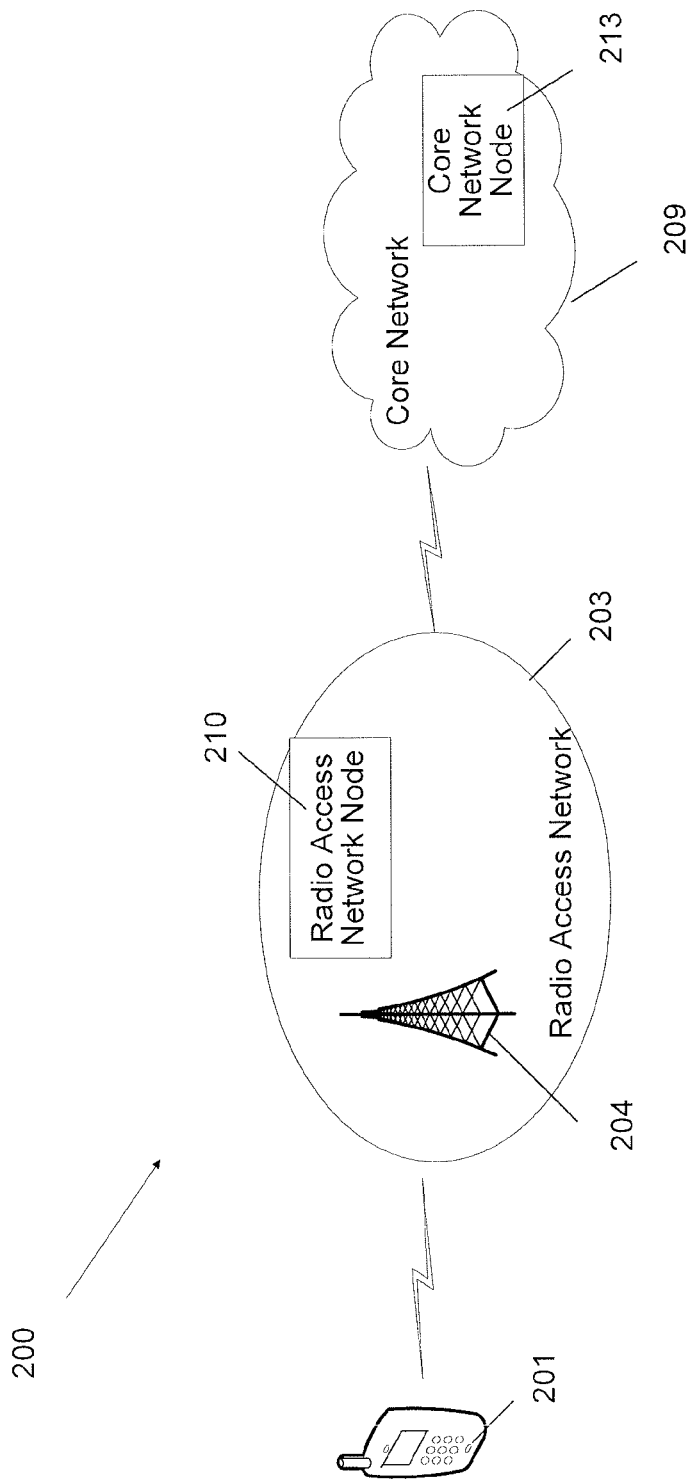
FIG. 2 is a schematic block diagram illustrating embodiments of a communication network.

FIG. 2 is a simplified illustration of an embodiment of a communication network 200. The communication network 200 is a telecommunication network using wireless and/or wired communication techniques. The communication network 200 may use technologies such as Long Term Evolution (LTE), General Packet Radio Service (GPRS), Enhanced Data rates for Global Evolution (EDGE), etc.

In the communication network 200, a user equipment 201 is connected to a radio access network 203 using a wireless communication technology. The radio access network 203 comprises at least one base station 204, such as e.g. a NodeB, eNodeB (eNB) or any other network unit capable to communicate over a radio carrier with the user equipment 201. The user equipment 201 may be any suitable communication device or computational device with communication capabilities capable to communicate with the base station 204 over a radio channel. The user equipment 201 may for instance be, but is not limited to, mobile phone, smart phone, Personal Digital Assistant (PDA), laptop, MP3 player, portable Digital Video Disc (DVD) player, or similar media content devices, digital camera, or even stationary devices such as a Personal Computer (PC) or Television unit (TV). A PC may also be connected via a mobile station as the end station of the broadcasted/multicasted media. The user equipment 201 may be referred to as UE in some of the drawings. The communication network 200 further comprises a core network 209 which provides various services to the user equipment 201 who is connected by the radio access network 203.

Even though FIG. 2 shows one user equipment 201 and one base station 204, it should be appreciated for a person skilled in the art that the communication network 200 may comprise a plurality of user equipments 201 and base stations 204. The radio access network 203 comprises at least one radio access network node 210 and the core network 209 comprises at least one core network node 213. The user equipment 201, radio access network node 210, base station 204, and core network node 213 comprise radio interfaces configured to enable transmission and receipt of radio signals to/from each other.

Figure 3:
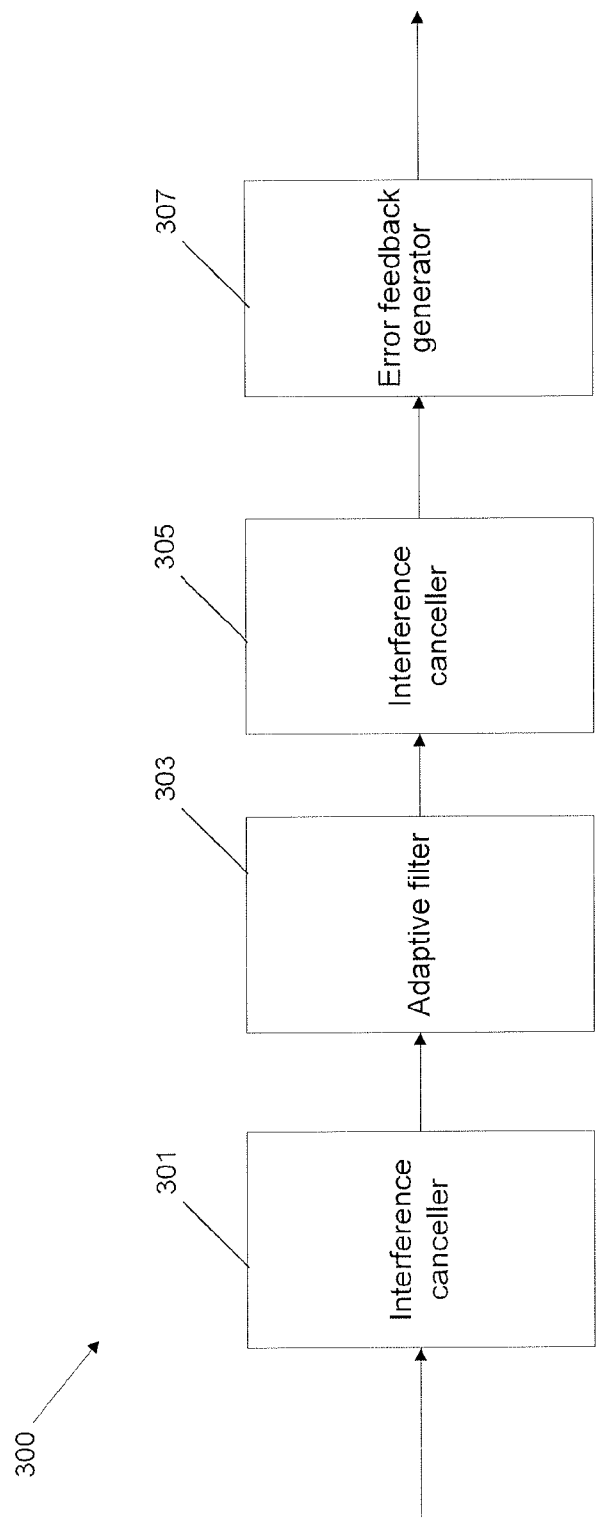
FIG. 3 is a block diagram illustrating embodiments of a LOS-MIMO configuration in general.

FIG. 3 shows a block diagram of a simplified exemplary embodiment of a 2×2 LOS-MIMO radio link system 300 where canceling is performed both before and after an adaptive filter. Detailed example embodiments of the blocks in FIG. 3 will be described later with reference to FIG. 4. The 2×2 LOS-MIMO radio link system 300 is comprised in a communication node. The communication node may be a user equipment 201, a base station 204, a radio access network node 210, or a core network node 213. Even though FIG. 3 shows only one arrow for input signals, a person skilled in the art, having the 2×2 LOS-MIMO system 300 in mind, will understand that this arrow represents at least two input signals.

The interference between the input signals is cancelled using a first interference canceller 301. Then, the interference cancelled signals and received input signals are filtered using adaptive filters 303. After the filtering 303, a second interference canceling 305 is performed. Thus, the interference canceling is split into two steps, one before the filtering 303 and one after the filtering 303. In one embodiment, the largest part of the interference canceling is done before the filtering 303 and the rest of the interference canceling is done after the filtering 303. An error feedback generator 307 performs symbol decision, symbol error detection and modifies symbol errors for a filter coefficient update. In an embodiment where the communication node is e.g. a user equipment 201, the output data is output to for example the base station 204 in FIG. 2, such as e.g. an eNodeB. Even though FIG. 3 shows only one arrow for output signals, a person skilled in the art, having the 2×2 LOS-MIMO system 300 in mind, will understand that this arrow represents two output signals. The input signals are the same as the output signals.

Figure 4:
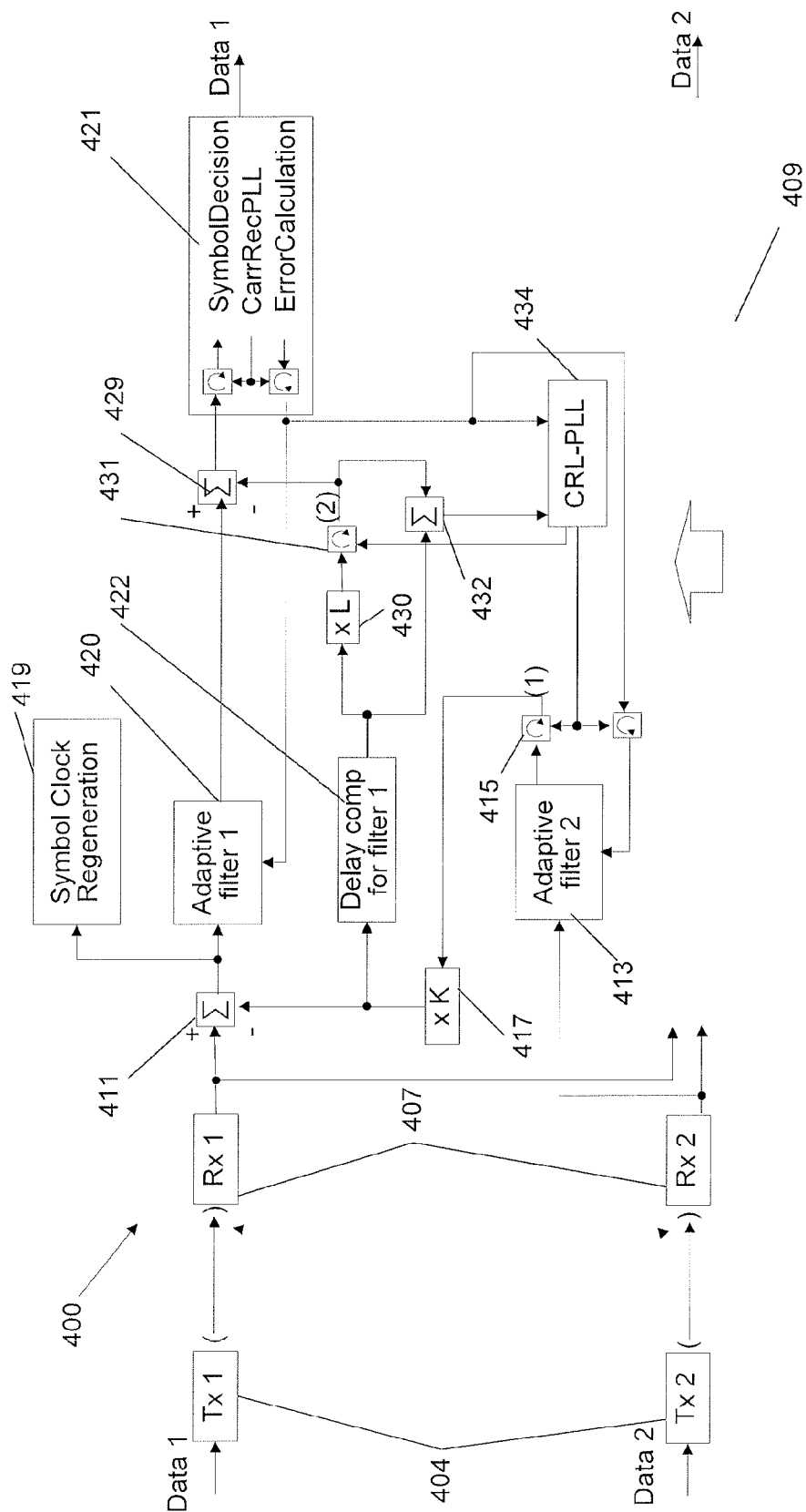
FIG. 4 is a block diagram illustrating embodiments of a LOS-MIMO configuration in detail.

FIG. 4 shows one exemplary embodiment of a LOS-MIMO radio link system 400 in more detail. As mentioned above, the system 400 is comprised in a communication node. The 2×2 LOS-MIMO radio link system 400 exemplified in FIG. 4, comprises two antennas Tx1, Tx2 404 at the transmitter and two antennas Rx1, Rx2 407 at the receiver. The system 400 in FIG. 4 corresponds to the system 300 shown in FIG. 3. Even though FIGS. 3 and 4 illustrate a 2×2 system as an example, a person skilled in the art will understand that this applies equally to any order of LOS-MIMO systems, e.g. 3×3, 4×4 etc. An increase of the order of the LOS-MIMO system requires additional sum points for cancelling of the additional signals. The first transmitter antenna Tx1 404 transmits data to the first receiver antenna Rx1 407 and the second receiver antenna Rx2 407. The second transmitter antenna Tx2 404 transmits data 2 to the first receiver antenna Rx1 407 and the second receiver antenna Rx2 407. In the following, the path of the data received at the first receiver antenna Rx1 407 will be described as an example. The dotted box 409 illustrates that the same handling of the received signals is also performed when received at the second receiver antenna Rx2 407, but is not repeated for the sake of simplicity.

The input signal received at the first receiver antenna Rx1 407 is added in a first summing point 411 together with the negative output from a second adaptive filter 413. Before adding the output from the second adaptive filter 413 with the input from the first receiver antenna Rx1 407, the output from the second adaptive filter 413 is phase rotated in e.g. a pre-phase rotator 415 and multiplied with a constant, e.g. a constant K 417. The constant K 417 may be for example 0.8. However, the constant K may be any constant from 0 to 1. The addition with the negative output from the second adaptive filter 413 cancels a majority of the interference between the two signals. The summing point 411 and the constant K 417 represents the first interference canceling, and corresponds to box 301 in FIG. 3. After the interference canceling, a symbol clock is regenerated using a symbol clock regenerator 419. The symbol clock regenerator 419 uses the signal after summing point 411 which is also the input to a first adaptive filter 420. The output from the canceling is then filtered in the first adaptive filter 420 together with the received input data. The first and second adaptive filters 413, 420 perform an adaptation so that the part of the signals from the first adaptive filter 420 and the second adaptive filter 413 that shall cancel them self out are identical.

The output from the canceling is provided to a unit performing symbol decision, Carrier Recovery Phase Locked Loop (CarrRecPLL) and error calculation, i.e. error feedback generator 421. Data 1 is output from the error feedback generator 421. The error feedback generator 421 further comprises an output in terms of error feedback for the filter update. The first adaptive filter 420 and the second adaptive filter 413 are updated by the error feedback generation 421 so that the Tx2 part of the signal after the first adaptive filter 420 is identical to the fractional part (K*L) of Tx2 from the second adaptive filter 413. The output data is the same as the input data.

The output signal from the multiplication with the constant K 417 is also sent through a delay compensation for filter 1 422. As mentioned earlier, the output from the second adaptive filter 413 is added in front of the first adaptive filter 420, i.e. the first summing point 411. Since a second summing point 429 must be aligned with the first summing point 411 to achieve a complete canceling, the second part must be delayed to compensate for the delay in the first adaptive filter 420. The first adaptive filter 420, the second adaptive filter 413 and the delay compensator 422 corresponds to box 303 in FIG. 3. The output of the delay compensation for filter 1 422 is multiplied with a constant L 430, which may be e.g. 0.2. As mentioned earlier the constants K 417 and L 430 may have values between 0 and 1. In an exemplary embodiment the distribution is to cancel 80% of the interference before and 20% after the first adaptive filter 420, i.e. K=0.8 and L=0.2.

The signal multiplied with L 430 is then phase rotated in a post-rotator 431. The post-phase rotator 431 increases the differential phase tracking and thereby the phase noise resistance. The output from the post-rotator 431 is provided with a negative sign and added in the second summing point 429 together with the output from the first adaptive filter 420, i.e. performing a second canceling. The canceling performed after the first adaptive filter 420 may be smaller than the canceling 411 performed before the first adaptive filter 420. The output of the delay compensator for the first adaptive filter 422 is added in a third summing point 432 together with the output from the post-rotator 431. This is convenient in order to get a bandwidth that is independent of the ratio between K 417 and L 430. However, the output from the post-rotator 431 may be used directly without adding the output from the delay comp 422. The constant L 430, the post-rotator 431 and the summing points 429 and 432 illustrates the second interference canceling and corresponds to box 305 in FIG. 3. As mentioned above, both the pre-rotator 415 and post-rotator 431 are used to adjust the phase of the output from the second adaptive filter 413 in order to get an accurate cancellation of the signal transmitted from the transmitter antenna Tx2 404 and received in the receiver antenna Rx1 407 by means of the signal transmitted from the transmitter antenna Tx2 404 which is received in the receiver antenna Rx2 407.

The output of the third summing point 432 and an output from the error feedback generator 421 are provided to a canceller phase locked loop (CLR-PLL) 434. Since a second part of the interference canceling is done after the filtering, the bandwidth of the CLR-PLL 434 for this part may be high because the filter delay is not comprised in the round trip delay of this loop. The CLR-PLL 434 comprises both loops formed by CLR-PLL 434+pre-phase rotator 415+K 417+ summing point 411+error feedback generator 421 and CLR-PLL 434+post-rotator 431+second summing point 429+error feedback generator 421.

The distribution between addition before and after the first adaptive filter 1 420 may be a trade-off between symbol clock regeneration 419 performance and differential phase noise suppression. A suitable distribution in high phase noise environment may be to add 80% before and 20% after the filter by using the constants K 417 and L 430, i.e. K=0.8 and L=0.2. Basically the constants may be of any value. However, if the sums of the two canceling parts ends up in unity, the bandwidth of the update of the second adaptive filter 2 413 is constant and independent of the distribution between pre- and post-canceling.

Note that in FIG. 4, showing an embodiment of the present solution, the input to the delay comp 422 is taken after the constant K 417. In other embodiments, the input may be taken before the constant K 417.

The implementation of the "dual" CLR-PLL 434 may vary but the following may be applicable:

The control of the post-rotator 431 may be of 1st order and may have a steady state value of zero. The simplest way to achieve zero as steady state may be to use the actual phase rotation of the post-rotator 431 as the phase error input for control of the pre-rotator 415. The pre-rotator 415 loop may be of 1st or 2nd order.

From a loop point of view the two rotators, i.e. the pre-rotator 415 and the post-rotator 431 are in parallel, i.e. they both rotate the output from the second adaptive filter 2 413, and it may from a stability point of view not be possible to add the output from two loop integrators. However, since the integrator output of the high bandwidth loop is used as error input to the low bandwidth loop it may be possible to achieve total stability in a simple way. In that case the pre-rotator loop 415 may be of 2nd order which makes it possible to compensate for frequency errors without any performance degradation.

Figure 5:
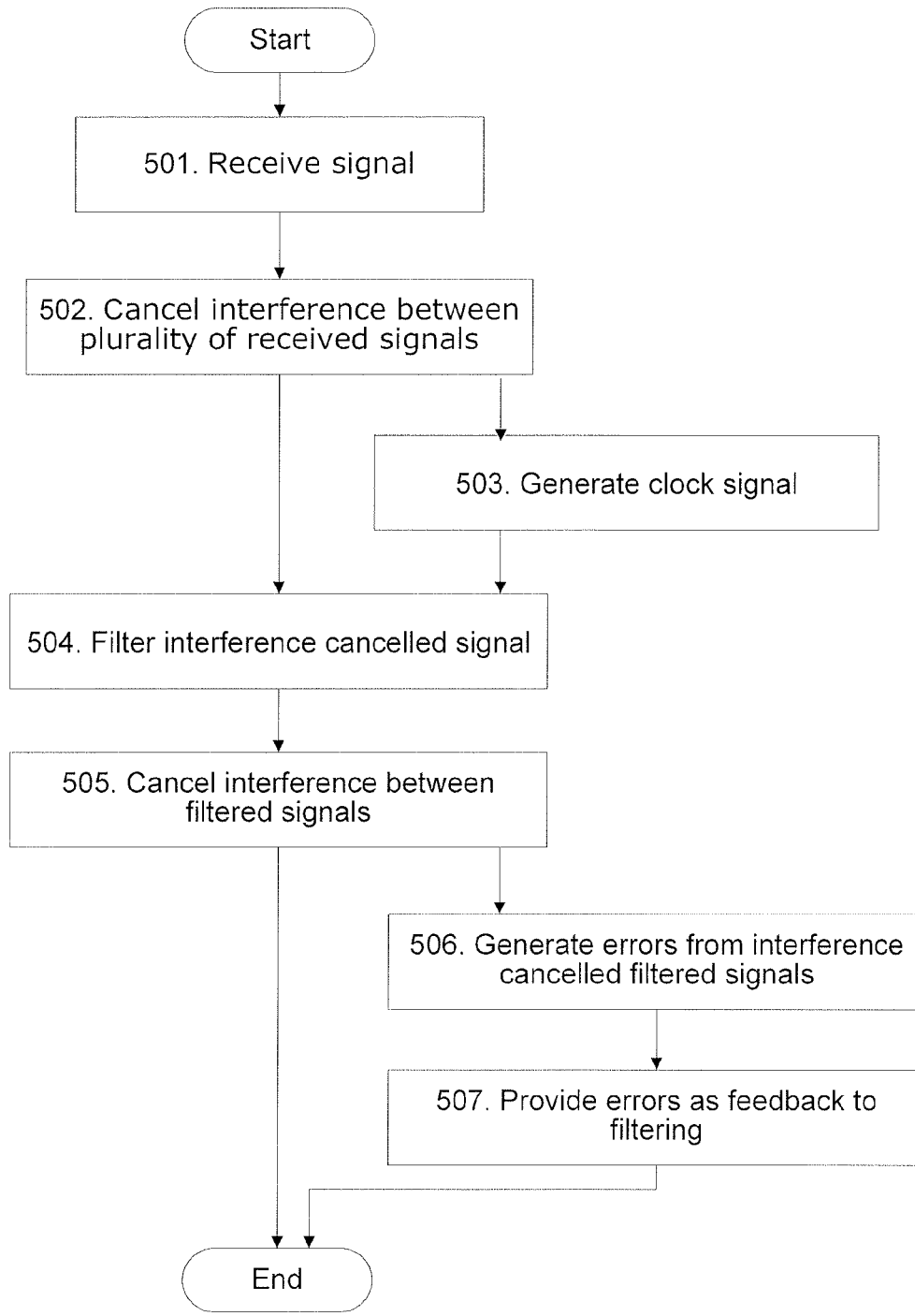
FIG. 5 is a flowchart depicting embodiments of a method in a communication node.

The system 300, 400 described above will now be described as a method seen from the perspective of a communication node 201, 204, 210, 213. FIG. 5 is a flowchart describing the present method in the communication node 201, 204, 210, 213 for canceling interference between a plurality of signals in a communication network 200. The communication node 201, 204, 210, 213 comprises a plurality of receiver antennas 407 each being configured to receive signals from a respective transmitter(s) 404. The communication node 201, 204, 210, 213 may comprise one of a multiple-input multiple-output system, referred to as MIMO, a line-of sight MIMO, referred to as LOS-MIMO and Cross Polarization Interference Canceller, referred to as XPIC. In some embodiments, the communication node 201, 204, 210, 213 comprises a radio interface and is one of a user equipment 201, base station 204, core network node 213 and radio access network node 210.

The method comprises the further steps to be performed in the communication node 201, 204, 210, 213:

Step 501

The communication node 201, 204, 210, 213 receives at each of a plurality of receiver antennas 407, a respective signal.

Step 502

The communication node 201, 204, 210, 213 cancels a first part of interference between the plurality of received signals.

Step 503

In some embodiments, the communication node 201, 204, 210, 213 generates a clock signal being synchronized with the received signal. In other words, a symbol clock is regenerated.

Step 504

The communication node 201, 204, 210, 213 filters the interference cancelled signals and the received input signals.

Step 505

The communication node 201, 204, 210, 213 cancels a second part of interference between the filtered signals.

In some embodiments, the first part interference canceling before the filtering is larger than the second part interference canceling after the filtering.

Step 506

In some embodiments, the communication node 201, 204, 210, 213 generates errors from the interference cancelled filtered signals.

Figure 6:
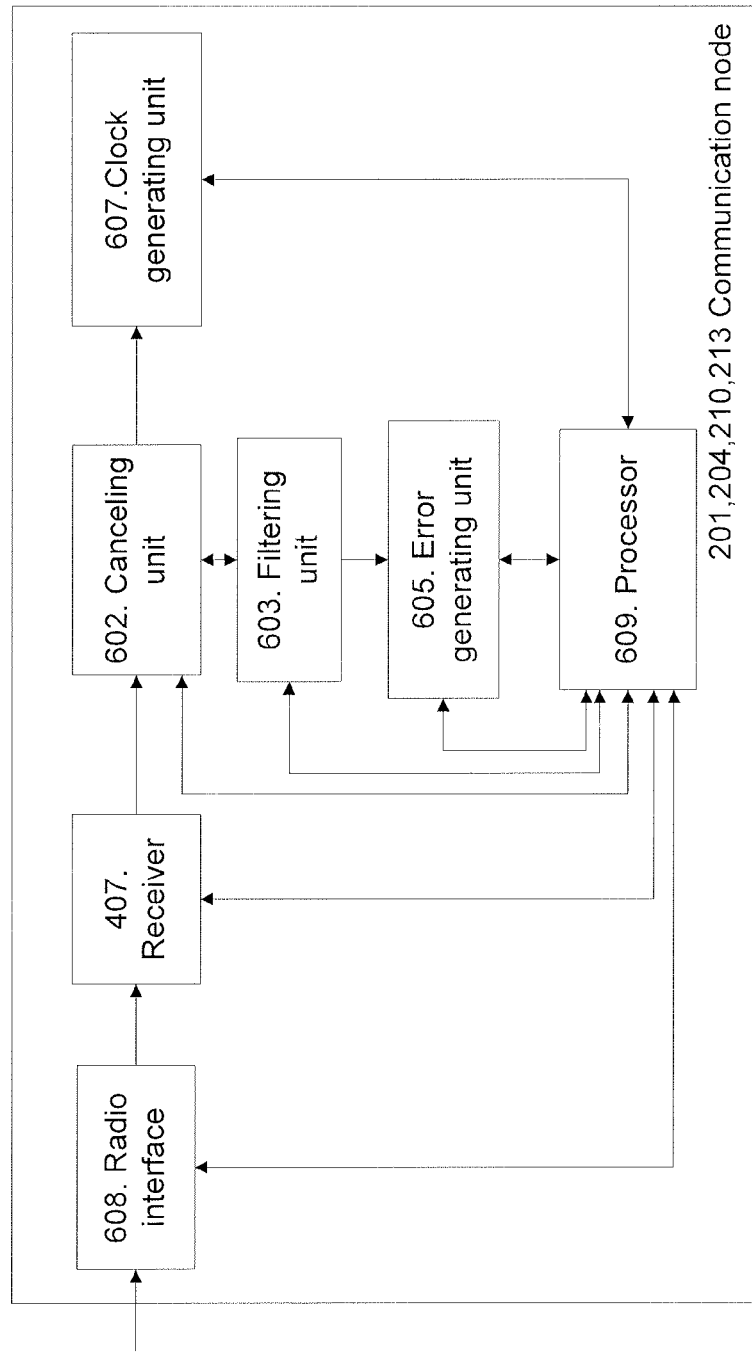
FIG. 6 is a schematic block diagram illustrating embodiments of a communication node.

To perform the method steps shown in FIG. 5 for canceling interference between a plurality of signals in a communication network 200, the communication node 201, 204, 210, 213 comprises a communication node arrangement as shown in FIG. 6. The communication node 201, 204, 210, 213 may comprise one of a multiple-input multiple-output system, referred to as MIMO, a line-of sight MIMO, referred to as LOS-MIMO and Cross Polarization Interference Canceller, referred to as XPIC.

The communication node 201, 204, 210, 213 comprises a plurality of receiver antennas 407 each being configured to receive a respective signal from a respective transmitter(s) 404. The communication node 201, 204, 210, 213 further comprises a canceling unit 602 configured to cancel a first part of interference between the plurality of received signals.

The communication node 201, 204, 210, 213 comprises a filtering unit 603 configured to filter the interference cancelled signals and the received input signals. The canceling unit 602 is further configured to cancel a second part of interference between the filtered signals. The first part interference canceling before the filtering may be larger than the second part interference canceling after the filtering.

In some embodiments, the communication node 201, 204, 210, 213 further comprises an error generating unit 605 which is configured to generate errors from the interference cancelled filtered signals, and to provide the errors as feedback to the filtering unit 603.

In some embodiments, the communication node 201, 204, 210, 213 comprises a clock generating unit 607 configured to generate a clock signal being synchronized with the received signal.

In some embodiments, the communication node 201, 204, 210, 213 comprises a radio interface 608 and is one of a user equipment 201, base station 204, core network node 213 and radio access network node 210.

The present mechanism for canceling interference between a plurality of signals in a communication network 200 may be implemented through one or more processors, such as a processor 609 in the communication node 201, 204, 210, 213 depicted in FIGS. 2, 3, 4 and 6, together with computer program code for performing the functions of the present solution. The processor 609 may be for example a Digital Signal Processor (DSP), Application Specific Integrated Circuit (ASIC), Field-programmable gate array (FPGA), or micro processor. The program code mentioned above may also be provided as a computer program product, for instance in the form of a data carrier carrying computer program code for performing the present solution when being loaded into the communication node. One such carrier may be in the form of a CD ROM disc. It is however feasible with other data carriers such as a memory stick. The computer program code may furthermore be provided as pure program code on a server and downloaded to the communication node 201, 204, 210, 213 remotely using the communication network 200.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A method in a communication node for canceling interference between a plurality of signals in a communication system, wherein the communication system operates in a high phase noise environment, the method comprising:
  receiving, at each of a plurality of receiver antennas, a respective signal, wherein the received signals have a differential phase noise between them so that the communication system is degraded by the differential phase noise;
  canceling a first part of interference between the plurality of received signals before a clock signal generation, reducing an effect of clock timing difference associated with the received signals;

after cancelling the first part of the interference, generating a clock signal which is synchronized with the received signals;

filtering the interference cancelled signals and the received signals; and canceling a second part of interference between the filtered signals, which canceling the second part of interference is delayed to compensate for a delay in the canceling the first part of interference, and which canceling the second part of interference comprises phase rotating the filtered signals to increase tracking of the differential phase noise and suppression of the differential phase noise; and wherein the first part interference canceling before the filtering is larger than the second part interference canceling after the filtering.

2. The method according to claim 1, further comprising:

generating errors from the interference cancelled filtered signals, providing the errors as feedback to the filtering (504).

3. The method according to claim 1, wherein the communication node comprises one of a multiple-input multiple-output system (MIMO), a line-of sight MIMO (LOS-MIMO), and Cross Polarization Interference Canceller (XPIC).

4. The method according to claim 1, wherein the communication node comprises a radio interface and is one of a user equipment, base station, core network node and radio access network node.

5. A communication node for canceling interference between a plurality of signals in a communication system, wherein the communication system operates in a high phase noise environment, the communication node comprising:

a plurality of receiver antennas each being configured to receive a respective signal, wherein the received signals have a differential phase noise between them so that the communication system is degraded by the differential phase noise, a canceling unit configured to cancel a first part of interference between the plurality of received signals before a clock signal generation, reducing an effect of clock timing difference associated with the received signals;

a clock generating unit configured to generate a clock signal which is synchronized with the received signal after cancelling the first part of the interference; and a filtering unit configured to filter the interference cancelled signals and the received input signals; and wherein the canceling unit is further configured to cancel a second part of interference between the filtered signals, which canceling the second part of interference is delayed to compensate for a delay in the canceling the first part of interference, and which cancelling the second part of interference comprises phase rotating the filtered signals to increase tracking of the differential phase noise and suppression of the differential phase noise, wherein the first part interference canceling before the filtering is larger than the second part interference canceling after the filtering.

6. The communication node according to claim 5, further comprising:

an error generating unit configured to generate errors from the interference cancelled filtered signals, and to provide the errors as feedback to the filtering unit.

7. The communication node according to claim 5, wherein the communication node comprises one of a multiple-input multiple-output system (MIMO),a line-of sight MIMO (LOS-MIMO), and Cross Polarization Interference Canceller (XPIC).

8. The communication node according to claim 5, wherein the communication node comprises a radio interface and is one of a user equipment, base station, core network node and radio access network node.

* * * * *